J. A. Preston,
Bottle Stopper,
Nº 36,126. Patented Aug. 5, 1862.
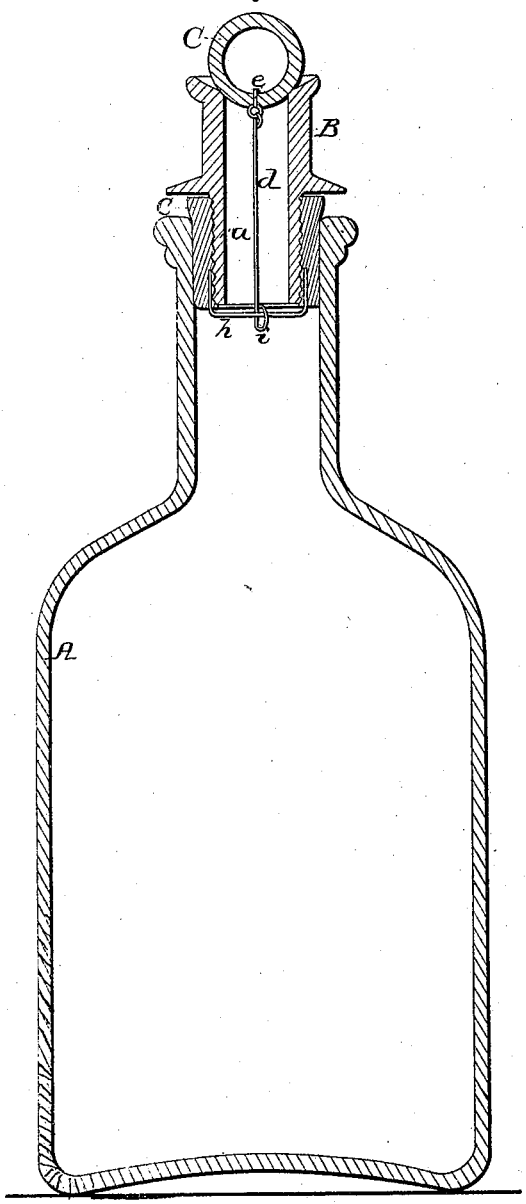
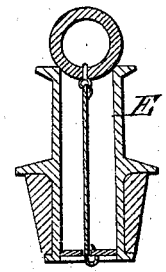
Witnesses:
N. W. Stearns
P. E. Rischemacher
Inventor:
John Augustus Preston
by his attorney
Samuel Cooper
pr. Rouch

UNITED STATES PATENT OFFICE.

JOHN A. PRESTON, OF BOSTON, MASSACHUSETTS, ASSIGNOR TO THE NEW ENGLAND GLASS COMPANY, OF SAME PLACE.

IMPROVED BOTTLE-STOPPER.

Specification forming part of Letters Patent No. 36,126, dated August 5, 1862.

*To all whom it may concern:*

Be it known that I, JOHN AUGUSTUS PRESTON, of Boston, in the county of Suffolk and State of Masssachusetts, have invented certain Improvements in Self-Acting Bottle-Stoppers, of which the following is a full, clear, and exact description, reference being had to the accompanying drawings, making part of this specification, in which—

Figure 1 is a vertical section through a bottle with my improved stopper applied thereto; Fig. 2, section of a stopper to be referred to hereinafter.

In the improved bottle-stopper for which Letters Patent of the United States were granted to me June 25, 1861, the objection to the metallic mouth-piece and ball or valve, which became corroded and dirty, was obviated by making the mouth-piece, the ball or valve, and the stem to which the ball was attached all of glass. This I have found to answer well with bottles or decanters of a certain size, as those containing a quart or more; but in practice I find that with smaller sizes the glass stem to which the valve is attached, and the glass button at its end, which prevents the ball or valve from falling out entirely when the bottle is turned down to pour out its contents, occupy so much space in the throat when made sufficiently large to have the required strength that they obstruct the flow of the liquid. This objection I have obviated by my present invention, in which I retain the essential advantages of having the mouth-piece and ball or valve (which are the parts exposed to wet and dust and are the most difficult to keep clean) made of glass, while by retaining the valve or ball by means of a small wire, cord, or chain suitably connected therewith, I leave the throat or opening sufficiently free, even in the smallest sized stoppers.

That others skilled in the art may understand and use my invention, I will proceed to describe the manner in which I have carried it out.

In the said drawings, A represents a bottle, in which the stopper B, of glass, is firmly secured. The lower part or neck, a, of the stopper has a screw formed on it, which is covered by a cylinder or sleeve, c, of cork, which is pressed firmly into the neck of the bottle. A glass ball, C, which acts as a valve to close the mouth of the stopper B, but falls away from it when the bottle is turned down to pour out its contents, is held from falling out entirely by a wire, d, which is linked to a staple, e, cemented in or otherwise suitably attached to the ball C. A loop, i, on the lower end of this wire embraces a wire, h, which extends across the lower end or throat of the stopper, and is held in place by being bent up at each end and inserted between the glass and the cork, the length of this loop being such as will allow the ball to fall away sufficiently from the mouth of the stopper.

The wire d, which I prefer to have made of plated or galvanized iron, may be replaced by a small chain, or even by a string; but I prefer the wire.

If the same arrangement of parts should be applied to a metal stopper, E, as shown in Fig. 2, its operation would be the same; but the advantages of ease of keeping clean by washing, which I claim for this present invention as well as for the former one, would not be carried out, the metal requiring not only washing but rubbing or polishing to keep it bright.

What I claim as my invention, and desire to secure by Letters Patent, is—

The glass stopper B, in combination with the glass ball or valve C, secured thereto by the wire d, (or its equivalent, a chain or thread,) attached at e to the ball, and connected at its lower end to a wire or cross-brace, which prevents the ball from falling entirely out from the stopper, substantially as specified.

JOHN AUGUSTUS PRESTON.

Witnesses:
   THOS. R. ROACH,
   P. E. TESCHEMACHER.